J. P. MEYER.
HEDGE TRIMMER.
APPLICATION FILED AUG. 28, 1912.
1,089,719.
Patented Mar. 10, 1914.
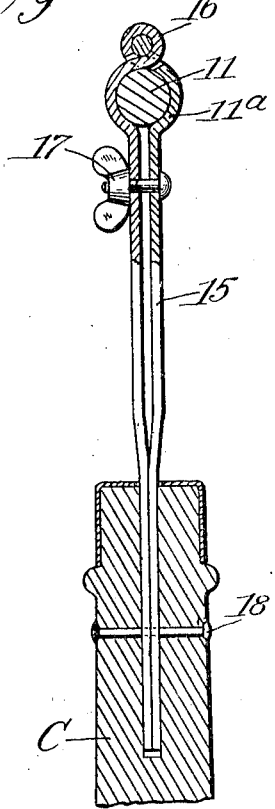
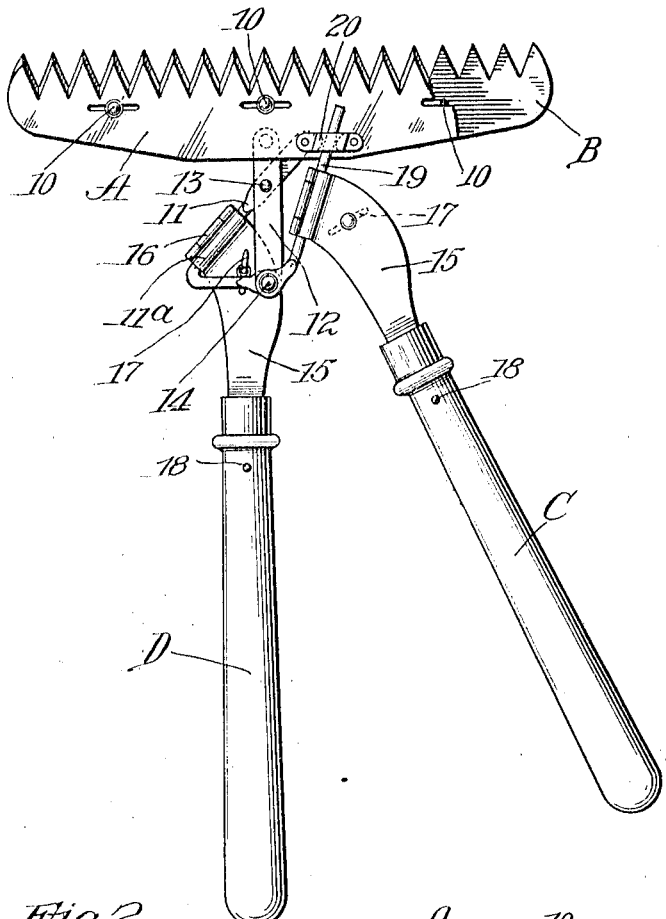
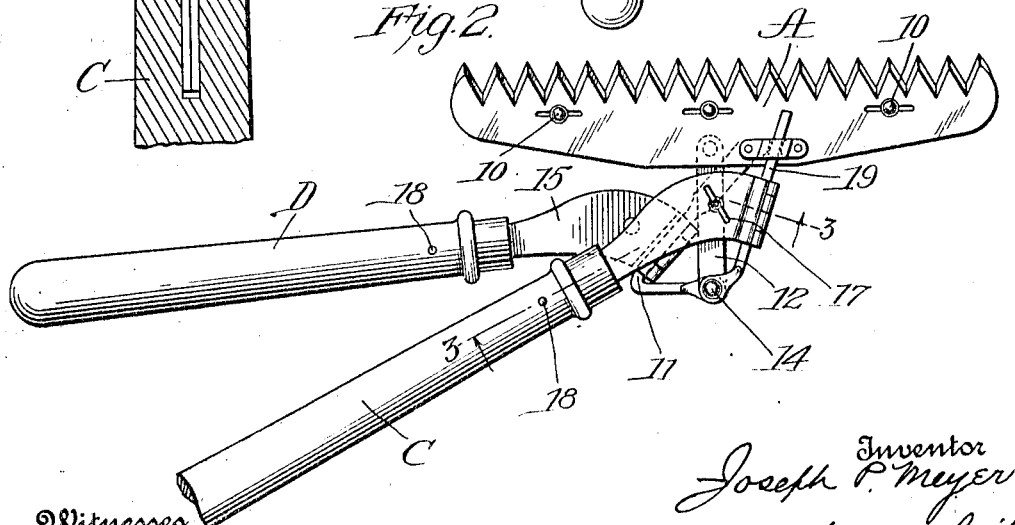
Inventor
Joseph P. Meyer

UNITED STATES PATENT OFFICE.

JOSEPH P. MEYER, OF ROCHESTER, NEW YORK.

HEDGE-TRIMMER.

1,089,719.

Specification of Letters Patent.

Patented Mar. 10, 1914.

Application filed August 28, 1912. Serial No. 717,653.

*To all whom it may concern:*

Be it known that I, JOSEPH P. MEYER, a citizen of the United States, and resident of Rochester, county of Monroe, State of New York, have invented certain new and useful Improvements in Hedge-Trimmers, of which the following is a specification.

This invention comprises a pruning shears or hedge trimmer which is adapted by proper adjustments of the handles for cutting either vertically or horizontally, as well as at intermediate angles.

The invention will be described in connection with the accompanying drawing in which:

Figure 1 is a plan view of a complete shears, a part of the upper blade or cutter being broken away. Fig. 2 is a similar view showing the handle in another position. Fig. 3 is a section through one of the handles.

Referring to the drawing A, B indicates blades, and C and D the handles. The blade A is adapted to reciprocate relatively to blade B, being slotted and connected to the blade B by studs 10. The cutting edges of the blades are serrated in the usual manner.

The handle D is rigidly, but adjustably, connected to the blade B. As shown, the handle is clamped to a rod 11, which is rigidly secured to the blade B and extends rearwardly therefrom, and approximately at an angle of 45 degrees with the longitudinal line or axis of the blade. The rod 11 is secured directly to the blade B, and it is also secured to a second rod 12 which is riveted to the blade B. As shown the rod 11 is secured to the rod 12 at the point 13, and also at the point 14. The rod 11 may be integral with the rod 12 at the point 14 if desired. All that is necessary is that the rod 11 shall be rigidly secured to the blade B, and extend rearwardly therefrom at a suitable angle.

The handle D is secured to the rod 11 by means which will permit of adjusting it about the rod. As shown in Figs. 1 and 3, there is a clamp comprising two plates hinged together at 16, and having a recess 11ᵃ between them and adjacent the hinge for receiving the rod 11. These blades are provided with a clamping device 17, adjacent the rod 11 and on the side opposite the hinge. As will be seen by inspection of Fig. 3, the tang 15 can be very securely clamped to the rod and it may be readily released and reclamped in any desired position. The two plates of the tang 15 are brought together and secured in the handle D by a rivet 18, or other suitable means. The axis of the recess 11ᵃ is arranged at an angle of 45 degrees, more or less, to the axis of the handle D, and preferably the angle between the recess 11ᵃ and the handle is the same as the angle between the rod 11 and the line perpendicular to the axis of the blades, so that when the handle D is in position shown in Fig. 1 it will be at right angles to the axis of the blades. The recess 11ᵃ is also off-set to some extent from the axis of the handle D so that when the handle is in position shown in Fig. 1 it will be at right angles to the axis of the blades at or near their middle point.

The movable blade is operated by a rod 19 which is pivotally connected to the rods 11, 12 at 14, and which extends freely through an opening in a fitting 20 attached to the blade A. The handle C is substantially identical in construction with the handle D already described, and it is clamped to the pivoted rod 19 in the same manner in which the handle D is clamped as to the fixed rod 11.

For cutting the vertical sides of a hedge, or trimming round portions, the handles C, D are arranged as shown in Fig. 1. When it is desired to trim the flat top of a hedge, or any portion which is not readily accessible, the clamps 17 are loosened and the two handles are swung around upon their respective rods 11 and 19 to the position shown in Fig. 2, in which the handle D is approximately parallel with the axis of the blades and the handle C is in convenient position with respect to the handle D.

What I claim and desire to secure by Letters Patent is:

1. In a hedge trimmer, the combination of two blades having serrated cutting edges, said blades being slidably secured together, a rod secured to one of the blades and extending rearwardly and at an angle to the axis of the blade, a handle having a recess or socket to receive said rod, the said handle being adjustable about the longitudinal axis of the rod and provided with means for securing it in different positions thereon and a second handle operatively connected to the other blade.

2. A hedge trimmer comprising two serrated blades slidably secured together, a rod secured to one of said blades and extending rearwardly at an angle thereto, a handle having a recess to receive the rod, said recess being arranged at an angle to the axis of the handle, and said handle being adapted to swing about the longitudinal axis of the rod and provided with means for securely clamping it to the rod in different positions and a second handle operatively connected to the other blade.

3. A hedge trimmer comprising two serrated blades slidably secured together, a rod secured to one of said blades and extending rearwardly therefrom at an angle to the axis of the blade, a second rod pivotally secured to the first rod and connected to operate the other blade, and a pair of handles fitted to said rods respectively, the said handles having recesses to receive the rods and to be adjustable around the longitudinal axis of the rods, and having means for securing them to the rods in any desired adjustment.

4. A hedge trimmer comprising two serrated blades slidably secured together, a rod secured to one of said blades and extending rearwardly therefrom at an angle to the axis of the blade, a second rod pivotally secured to the first rod and connected to operate the other blade, a pair of handles fitted to said rods respectively, the said handles having recesses to receive the rods and to be adjustable around the rods and having means for securing them to the rods in any desired adjustment, the recesses being arranged at an angle to the axes of the handles, for the purpose set forth.

5. A hedge trimmer comprising two serrated blades slidably secured together, a rod rigidly secured to one of said blades, a second rod loosely connected to the other blade and pivotally connected to the first named rod, and handles connected to said rods, the said handles each comprising a tang consisting of two plates hinged together at their outer ends and provided with recesses adjacent the hinge to receive one of the rods and also provided with means for clamping the plates together to secure the handle upon the rod in any desired position.

6. A hedge trimmer comprising two serrated blades slidably secured together, a rod rigidly secured to one blade and extending rearwardly therefrom at an angle to the axis of the blade, a handle comprising a tang consisting of two plates hinged together at their outer ends and having coöperating recesses to receive said rod, means for clamping the plates together to secure the handle on the rod in any desired position, and a second handle operatively connected to the other blade.

In testimony whereof I affix my signature in presence of two witnesses.

JOSEPH P. MEYER.

Witnesses:
LEO A. SCHLITZER,
LOUISA M. MEYER.